US006553753B1

(12) United States Patent
Payling et al.

(10) Patent No.: US 6,553,753 B1
(45) Date of Patent: Apr. 29, 2003

(54) CONTROL SYSTEMS AND METHODS FOR WATER INJECTION IN A TURBINE ENGINE

(75) Inventors: Stephen R. Payling, Cincinnati, OH (US); Robert P. Coleman, Fairfield, OH (US); Curtis L. Brown, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/354,273

(22) Filed: Jul. 15, 1999

Related U.S. Application Data

(60) Provisional application No. 60/094,094, filed on Jul. 24, 1998.

(51) Int. Cl.[7] .................................................. F02C 7/16
(52) U.S. Cl. ........................................ 60/39.53; 60/785
(58) Field of Search ........................... 60/39.3, 39.53, 60/39.07, 785

(56) References Cited

U.S. PATENT DOCUMENTS

| | | | |
|---|---|---|---|
| 2,115,338 A | 4/1938 | Lysholm | |
| 2,625,012 A | 1/1953 | Larrecq | |
| 2,678,531 A | 5/1954 | Miller | |
| 2,686,631 A | * 8/1954 | Jordan | 230/209 |
| 4,301,649 A | 11/1981 | Walker | |
| 4,448,018 A | 5/1984 | Sayama et al. | |
| 4,711,084 A | * 12/1987 | Brockett | 60/39.07 |
| 4,896,499 A | 1/1990 | Rice | |
| 4,949,544 A | 8/1990 | Hines | |
| 4,984,426 A | 1/1991 | Santi | |
| 4,991,391 A | 2/1991 | Kosinski | |
| 5,150,567 A | * 9/1992 | Farrell | 60/39.02 |
| 5,390,464 A | 2/1995 | Swenson | |
| 5,463,873 A | 11/1995 | Early et al. | |
| 5,535,584 A | 7/1996 | Janes | |
| 5,553,448 A | 9/1996 | Farrell et al. | |
| 5,577,378 A | 11/1996 | Althaus et al. | |
| 5,581,997 A | 12/1996 | Janes | |
| 5,622,044 A | 4/1997 | Bronicki et al. | |
| 5,669,217 A | 9/1997 | Anderson | |
| 5,867,977 A | 2/1999 | Zachary et al. | |
| 6,012,279 A | * 1/2000 | Hines | 60/39.05 |

FOREIGN PATENT DOCUMENTS

| | | | |
|---|---|---|---|
| CH | 286978 | 3/1953 | |
| EP | 0781909 A2 * | 7/1997 | F02C/7/143 |
| EP | 0 889 212 A2 | 1/1999 | |
| FR | 1.007.140 | 5/1952 | |
| IT | 605502 | 6/1960 | |

OTHER PUBLICATIONS

Hill, P.G. and Peterson, C.R., "Mechanics and Thermodynamics of Propulsion", Addison–Wesley, Reading, MA, 1965, p. 276.*
International Search Report.
"SPS boosting hot day output by injecting water into compressor" by Robert Farmer, Gas Turbine World, pp. 35–37, Mar.–Apr. 1999.
Advertisement folder for LM6000 Sprint, GE Industrial AeroDerivatives, One Neumann Way S–158, Cincinnati, OH 45215–6301.

* cited by examiner

*Primary Examiner*—Ehud Gartenberg
(74) *Attorney, Agent, or Firm*—William Scott Andes; Armstrong Teasdale LLP

(57) ABSTRACT

Control systems and methods for controlling injection of water into a turbine engine are described. In an exemplary embodiment, the water injection system includes a plurality of nozzles for injecting water into a gas flow through the engine, a water source, a water manifold, a water supply line extending from the water source to the water manifold, a water metering valve for controlling flow through the water supply line, an air manifold, an air flow pipe coupled to the high pressure compressor and to the air manifold, a plurality of air feeder tubes extending from the air manifold to the nozzles, and a plurality of water feeder tubes extending from the water manifold to the nozzles.

12 Claims, 16 Drawing Sheets

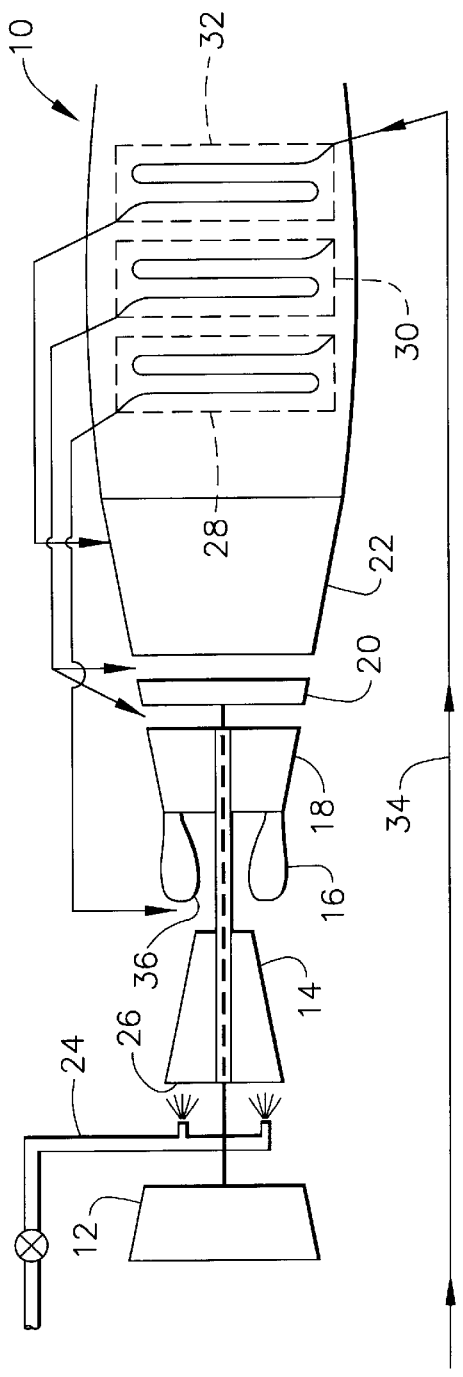
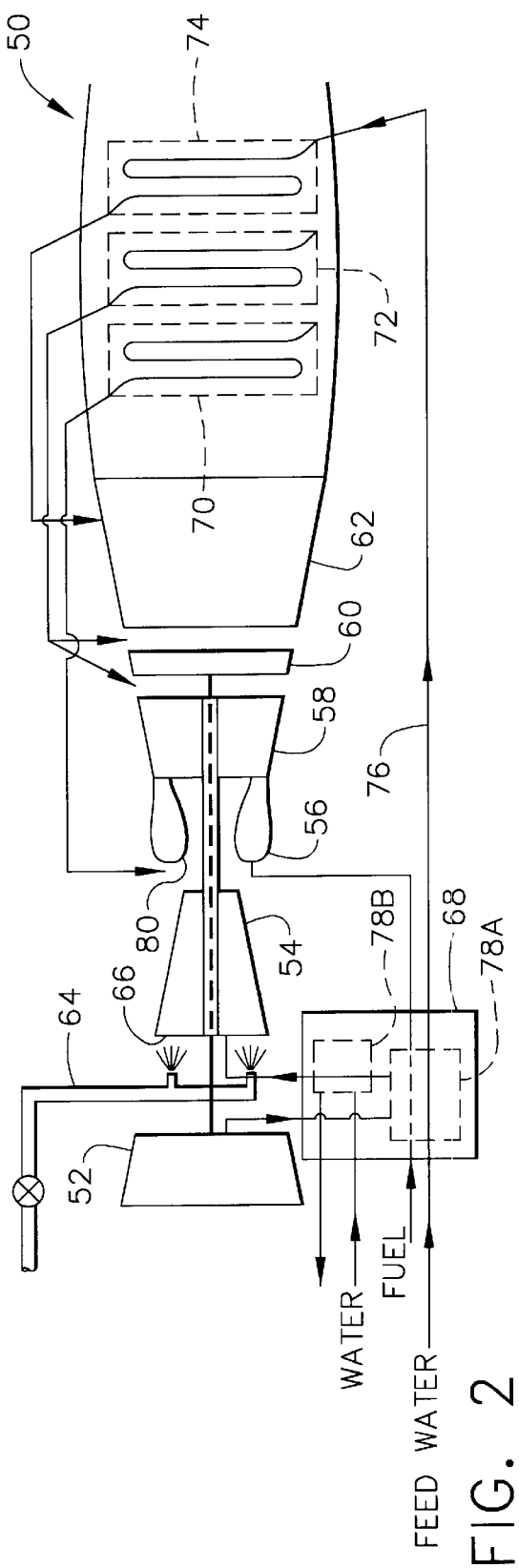
FIG. 1
FIG. 2

| AMBIENT TEMPERATURE | 30F/-1C | 45F/7C | 59F/15C | 70F/21C | 80F/27C | 90F/32C |
|---|---|---|---|---|---|---|
| SHAFT OUTPUT MW | 51.5 | 50.0 | 47.2 | 44.4 | 41.4 | 38.4 |
| HEAT RATE (BTU/KW-HR) | 8301 | 8377 | 8472 | 8572 | 8687 | 8826 |
| FLOW LBS/SEC | 309 | 300 | 290 | 280 | 270 | 259 |
| WATER GPM/MIN | 0 | 4.0 | 7.5 | 9.4 | 10.0 | 11.1 |

FIG. 15

| NOZZLE | DROP SIZE RR ($\mu m$) | PERCENT EVAP. IN DUCT | DROP SIZE AT HP INLET RR ($\mu m$) | PERCENT DEP. ON HP INLET VANES | LOCATION OF COMPLETE EVAP. |
|---|---|---|---|---|---|
| 1. PRESS. AT. AT 3000 PSI | 23 | 28 | 22 | 88 | AT HP COMP. DISCH** |
| 2. PRESS. AT. AT 3000 PSI | 26* | 21 | 24.5 | 91 | −7% THROUGH HP |
| 3. AIR AT. AT −22 SCFM | 14.5 | 41 | 14 | 66 | 11th STAGE OF HP |
| 4. AIR AT. AT −33 SCFM | 10.5 | 51 | 9.9 | 30 | 7th STAGE OF HP |
| 5. AIR AT. AT −45 SCFM | 7.5 | 76 | 6.5 | NEGT | 3rd STAGE OF HP |

FIG. 17

| NOZZLE | DROP SIZE RR (μm) | PERCENT EVAP. IN DUCT | DROP SIZE AT HP INLET RR (μm) | PERCENT DEP. ON HP INLET VANES | LOCATION OF COMPLETE EVAP. |
|---|---|---|---|---|---|
| 1. PRESS. AT. AT 3000 PSI | 23 | 28 | 22 | 88 | AT HP COMP. DISCH** |
| 2. PRESS. AT. AT 3000 PSI | 26* | 21 | 24.5 | 91 | −7% THROUGH HP |
| 3. AIR AT. AT −22 SCFM | 14.5 | 41 | 14 | 66 | 11th STAGE OF HP |
| 4. AIR AT. AT −33 SCFM | 10.5 | 51 | 9.9 | 30 | 7th STAGE OF HP |
| 5. AIR AT. AT −45 SCFM | 7.5 | 76 | 6.5 | NEGT | 3rd STAGE OF HP |

FIG. 19

CONTROL SYSTEMS AND METHODS FOR WATER INJECTION IN A TURBINE ENGINE

CROSS-REFERENCE TO RELATED APPLICATIONS

This application claims the benefit of U.S. Provisional Application No. 60/094,094, filed Jul. 24, 1998.

The United States Government has rights in this invention pursuant to Contract No. DAAH10-98-C-0023.

BACKGROUND OF THE INVENTION

This invention relates generally to gas turbine engines and more particularly, to prebooster and precompressor water injection in a gas turbine engine.

Gas turbine engines typically include a compressor for compressing a working fluid, such as air. The compressed air is injected into a combustor which heats the fluid causing it to expand, and the expanded fluid is forced through a turbine. The compressor typically includes a low pressure compressor and a high pressure compressor.

The output of known gas turbine engines may be limited by the temperature of the working fluid at the output of the high pressure compressor, sometimes referred to as temperature "T3", and by the temperature of the working fluid in the combustor outlet, sometimes referred to as temperature "T41". To reduce both the T3 and T41 temperatures, it is known to use an intercooler positioned in the fluid flow path between the low pressure compressor and the high pressure compressor. In steady state operation, the intercooler extracts heat from the air compressed in the low pressure compressor, which reduces both the temperature and volume of air entering the high pressure compressor. Such reduction in temperature reduces both the T3 and T41 temperatures. Increased power output therefore can be achieved by increasing flow through the compressor.

Typically, cool water or air circulates through the intercooler, and heat is transferred from the air flow to the cool water or air. The water or air absorbs the heat, and the heated water or air is then removed. Removing the heated water or air results in losses in total cycle thermal efficiency. Therefore, although an intercooler facilitates increased power output, the intercooler reduces thermal efficiency of the engine. The intercooler also introduces pressure losses associated with the removal of air, the actual cooling of that air, and ducting the cooled air to the compressor. Further, it is impractical for an intercooler to also provide interstage cooling.

With at least some known intercoolers, the heated water is removed using a water cooler which dissipates the heated water through a cooling tower as vapor into the environment. Of course, releasing the vapor into the environment raises environmental concerns. Also, a significant amount of water is required by such intercoolers, and such high water consumption increases the operational costs.

It would be desirable to provide a partial increased power output as achieved with intercoolers yet also provide improved thermal efficiency as compared to at least known intercoolers. It also would be desirable to provide increased power output even for single rotor gas turbines.

SUMMARY OF THE INVENTION

These and other objects may be attained by a gas turbine engine including prebooster or precompressor water injection which provides many of the same advantages, yet overcomes some shortcomings, of intercooling. In an exemplary embodiment, a gas turbine engine suitable for use in connection with water spray injection includes a low pressure compressor, a high pressure compressor, and a combustor. The engine also includes a high pressure turbine, a low pressure turbine, and/or a power turbine. A water injection apparatus is provided for injecting water into an inlet of the high pressure compressor. The water spray injection apparatus is in flow communication with a water supply, and during engine operation, water is delivered from such supply through the injection apparatus to the inlet of the compressor.

In operation, air flows through the low pressure compressor, and compressed air is supplied from the low pressure compressor to the high pressure compressor. In addition a water spray is supplied to the inlet of the high pressure compressor, and the water spray enters into the high pressure compressor through the inlet. Due to the high temperature environment at the location at which the water spray is injected, the water spray partially evaporates before entering the high pressure compressor. The water spray cools the air flow in the high pressure compressor for at least each stage of compression through which such spray flows, i.e., until it evaporates. Usually about by the mid-stages of the high pressure compressor, and depending on the water quantity, the majority of the water spray is evaporated.

The air and water vapor is further compressed by the high pressure compressor, and the highly compressed air is delivered to the combustor. Airflow from the combustor drives the high pressure turbine the low pressure turbine, and the power turbine. Waste heat is captured by boilers, and heat from the boilers in the form of steam may be delivered to upstream components.

The water spray provides an advantage in that the temperature of the airflow at the outlet of the high pressure compressor (temperature T3) and the temperature of the airflow at the outlet of the combustor (temperature T41) are reduced in steady state operations as compared to such temperatures without the spray. Specifically, the water spray extracts heat from the hot air flowing into and through the high pressure compressor, and by extracting such heat from the air flow, the T3 and T41 temperatures are reduced and compressive horsepower is reduced. The heat is removed as the water vaporizes. Reducing the T3 and T41 temperatures provides the advantage that the engine is not T3 and T41 constrained, and therefore, the engine may operate at higher output levels than is possible without such water spray. That is, with the above described water spray injection and using the same high pressure compressor discharge temperature control limit, the high pressure compressor can pump more air which results in a higher pressure ratio and a higher output.

BRIEF DESCRIPTION OF THE DRAWINGS

FIG. 1 is a schematic illustration of a gas turbine engine including compressor water injection in accordance with one embodiment of the present invention;

FIG. 2 is a schematic illustration of a gas turbine engine including compressor water injection and intercooling in accordance with another embodiment of the present invention;

FIG. 15 is a chart illustrating the output, heat rate, flow, and water supplied to the engine illustrated in FIG. 8 at various ambient temperatures;

FIG. 17 is a table showing the results for pressure and air atomized nozzle operation;

FIG. 19 is a table showing the effect of nozzle performance on evaporation in the high pressure compressor.

DETAILED DESCRIPTION

Figure 3:
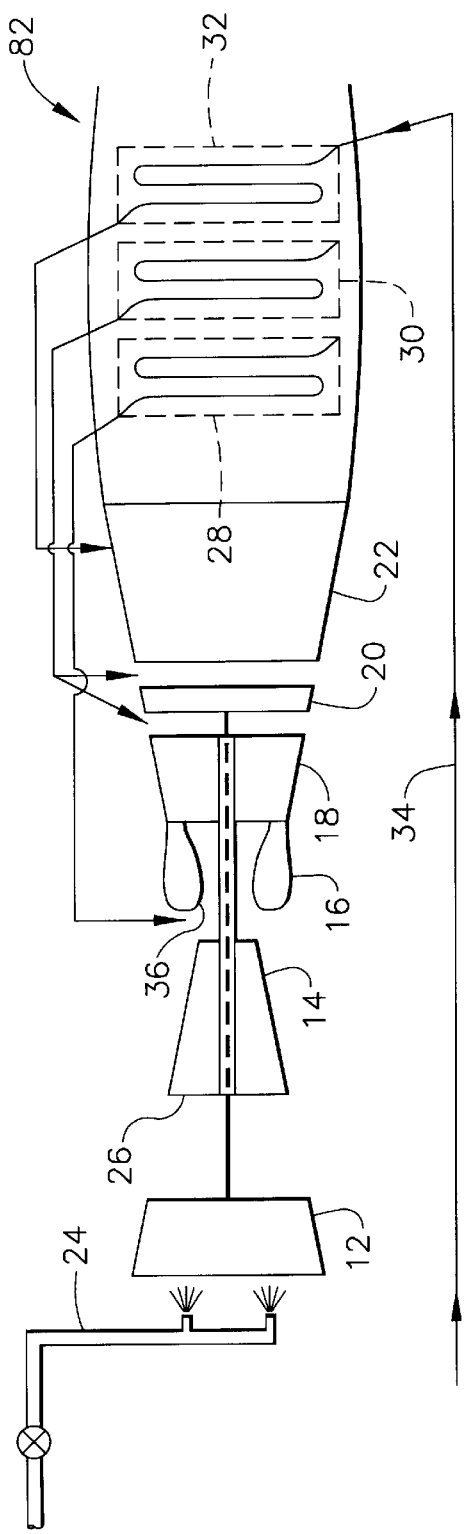
FIG. 3 is a schematic illustration of a gas turbine engine including booster water injection in accordance with one embodiment of the present invention.

Set forth below are exemplary configurations of water spray injection in accordance with various embodiments of the present invention. Initially, it should be understood that although specific implementations are illustrated and described, water spray injection can be practiced using many alternative structures and in a wide variety of engines. In addition, and as described below in more detail, water spray injection can be performed at the inlet of a high pressure compressor, at an inlet of the booster, or at both locations.

Water spray injection provides many of the same advantages of intercooling yet overcomes some shortcomings of intercooling. For example, and with intercooling, the heated water (or air) is removed and removal of such heated water (or air) reduces the thermal efficiency of the cycle as well as creates environmental concerns. The significant power increase provided by intercooling typically overcomes the shortcomings associated with intercooling and as a result, intercooling often is utilized when extra power is required using a different or larger airflow booster and a larger high pressure turbine flow function. Water pray injection, as describe below, provides a power increase which may be somewhat less than the maximum power increase provided in a similarly situated intercooler. With water spray injection, however, far less water is utilized and water exits the cycle as water vapor at exhaust gas temperature.

Referring now specifically to the drawings, FIG. 1 is a schematic illustration of a gas turbine engine 10 which, as is well known, includes a low pressure compressor 12, a high pressure compressor 14, and a combustor 16. Engine 10 also includes a high pressure turbine 18, a low pressure turbine 20, and a power turbine 22. Engine 10 further includes a water injection apparatus 24 for injecting water into an inlet 26 of high pressure compressor 14. Further details regarding water injection apparatus 22 are set forth below. For purposes of FIG. 1, however, it should be understood that apparatus 24 is in flow communication with a water supply (not shown) and water is delivered from such supply through apparatus 24 to inlet 26 of compressor 14. Apparatus 24 is air aspirated using a bleed source off compressor 14 to provide a finer spray mist. Waste heat boilers 28, 30, and 32 are located downstream of power turbine 22. As is known in the art, feed water is supplied to boilers 28, 30, and 32 via a feedwater line 34, and water in the form of steam is communicated from boilers 28, 30, and 32 to various upstream components. Particularly, steam from boiler 28 is provided to an inlet 36 of combustor 16, steam from boiler 30 is provided to an inlet of low pressure turbine 20 and an inlet of power turbine 22, and steam from boiler 32 is provided to a last stage of power turbine 22. Except for water spray injection apparatus 24, the various components of turbine 10 are known in the art.

In operation, air flows through low pressure compressor 12, and compressed air is supplied from low pressure compressor 12 to high pressure compressor 14. In addition, a water spray is supplied to inlet 26 of high pressure compressor 14, and the water spray enters into compressor 14 through inlet 26. Due to the high temperature environment at the location at which the water spray is injected, the water spray partially evaporates before entering high pressure compressor 14. The water spray cools the air flow in high pressure compressor 14 for at least each stage of compressor 14 through which such spray flows, i.e., until it evaporates. Usually by the sixth stage of compressor 14. the water spray is totally evaporated.

The air is further compressed by high pressure compressor 14, and highly compressed air is delivered to combustor 16. Airflow from combustor 16 drives high pressure turbine 18, low pressure turbine 20, and power turbine 22. Waste heat is captured by boilers 28, 30, and 32, and the waste heat steam is delivered to upstream components coupled to boilers 28, 30 and 32 as described above.

The water particles from water spray apparatus 24 provide the advantage that the temperature of the airflow at the outlet of high pressure compressor 14 (temperature T3) and the temperature of the airflow at the outlet of combustor 16 (temperature T41) are reduced as compared to such temperatures without the spray. Specifically, the water spray extracts heat from the hot air flowing into and through compressor 14, and by extracting such heat from the air flow, the T3 and T41 temperatures are reduced along with the required compressor power. Reducing the T3 and T41 temperatures provides the advantage that engine 10 is not T3 and T41 constrained, and therefore, engine 10 may operate at higher output levels by throttle pushing than is possible without such water spray. In addition to increased power output, water spray injection as described above provides the advantage of less water consumption as compared to intercooling under the same conditions.

FIG. 2 is a schematic illustration of another embodiment of a gas turbine engine 50 including water spray injection. Engine 50 includes a low pressure compressor 52, a high pressure compressor 54, and a combustor 56. Engine 50 also includes a high pressure turbine 58, a lower pressure turbine 60, and a power turbine 62. Engine 50 further includes a water injection apparatus 64 for injecting water into an inlet 66 of high pressure compressor 54. For purposes of FIG. 2, it should be understood that apparatus 64 is in flow communication with a water supply (not shown) and water is delivered from such supply through apparatus 64 to inlet 66 of compressor 54. An intercooler 68 also is positioned in series flow relationship with booster 52 to receive at least a portion or all of the air flow output by booster 52, and the output of intercooler 68 is coupled to inlet 66 of compressor 54. Of course, cooling water is supplied to intercooler 68 as illustrated or blower fans could be used for air cooling. Intercooler 68 could, for example, be one of the intercoolers described in U.S. Pat. No. 4,949,544.

Waste heat boilers 70, 72, and 74 are located downstream of power turbine 62. As is known in the art, feed water is supplied to boilers 70, 72, and 74 via a feedwater line 76 which extends through a first stage 78A of intercooler 68, and steam is communicated from boilers 70, 72, and 74 to various upstream components. Particularly, steam from boiler 70 is provided to an inlet 80 of combustor 56, steam from boiler 72 is provided to an inlet of low pressure turbine 60 and an inlet of power turbine 62, and steam from boiler 74 is provided to a last stage of power turbine 62. Except for water spray injection apparatus 64, the various components of turbine 50 are known in the art.

In operation, air flows through low pressure compressor 52, and compressed air is supplied from low pressure compressor 52 to high pressure compressor 54. At least some or all compressed air from low pressure compressor 52 is diverted to flow through a second stage 78B of intercooler 68, and such diverted air is cooled and supplied to inlet 66 of high pressure compressor 54. In addition, a water spray is supplied to inlet 66 of high pressure compressor 54, and the water spray enters into compressor 54 through inlet 66. Due to the higher temperature. environment at the location at which the water spray is injected, the water spray partially evaporates before entering high pressure compressor 54. The water spray cools the air flow in high pressure compressor 54 for at least each stage of compressor 54 through which such spray flows, i.e., until it evaporates. Usually by the sixth stage of compressor 54, the water spray is evaporated.

The air is further compressed by high pressure compressor 54, and highly compressed air is delivered to combustor 56. Airflow from combustor 56 drives high pressure turbine 58, low pressure turbine 60, and power turbine 62. Waste heat is captured by boilers 70, 72, and 74, and the waste heat as steam is delivered to upstream components coupled to boilers 70, 72, and 74 as described above.

By providing a combination of intercooling and water spray injection, it is believed that increased power output is provided by engine 50 as compared to engine 10. Intercooler 68 could take the flow field into the compressor down in temperature to where condensate could appear from ambient humidity. The water spray then could be added into compressor 54 to further reduce T3 at its exit along with reducing its power required to run. However, engine 50 requires more water as compared to engine 10, and engine 50 does dissipate some water to the environment, due to operation of intercooler 68 along with the additional water spray exiting the stack as a vapor at exhaust stack temperature. As compared to the results obtained if only intercooling is used to achieve a power output of engine 50, however, the combination of water spray injection and intercooling results in more water consumption.

Although not shown in the exemplary configuration set forth in FIG. 2, it is contemplated that rather than, or in addition to, water spray injection at inlet 66 of high pressure compressor 54, such injection can be performed at the inlet of low pressure compressor, or booster, 52 (booster water spray injection is illustrated in FIG. 3). Similar advantages in the decrease of T3 and T41 temperatures may be achieved by such injection.

An exemplary configuration of an engine 82 including booster water spray injection is set forth in FIG. 3. The configuration of engine 82 is substantially similar to engine 10 shown in FIG. 1 with the exception that water spray injection apparatus 24 is located at an inlet 38 of low pressure compressor, or booster, 12. In engine 82, water is injected into booster 12 and cools the air flowing through booster 12. Cooling the air flow through booster 12 provides the advantages of decreasing T3 and T41 temperatures as described above. Only about 1% water spray can be injected into booster 12, which water will evaporate by the end of the booster.

Figure 4:
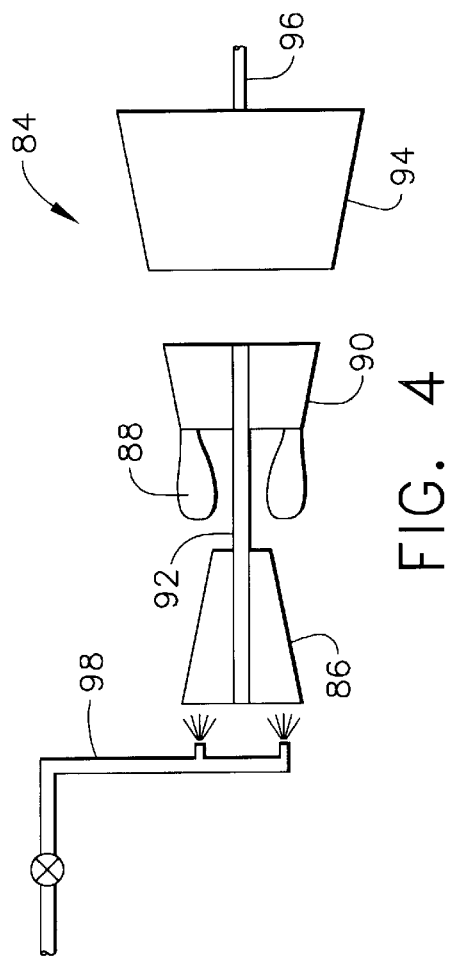
FIG. 4 is a schematic illustration of a single rotor gas turbine engine including compressor water injection in accordance with another embodiment of the present invention.

FIG. 4 is a schematic illustration of a single rotor gas turbine engine 84 including compressor water injection in accordance with another embodiment of the present invention. Engine 84 includes a high pressure compressor 86, a combustor 88, and a high pressure turbine 90. A shaft 92 coupled high pressure compressor 86 and high pressure turbine 90. A power turbine 94 is downstream from high pressure turbine 90, and a shaft 96 is coupled to and extends from power turbine 94. Water spray injection apparatus 98 is located at an inlet 100 of high pressure compressor 86.

Figure 5:
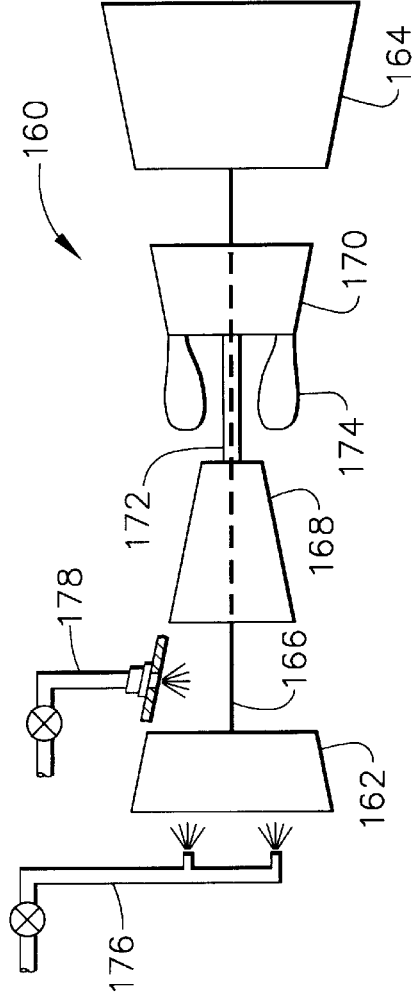
FIG. 5 is a schematic illustration of a gas turbine engine including booster and compressor water injection in accordance with still yet another embodiment of the present invention.

A dual rotor gas turbine engine 10 is shown schematically in FIG. 5. Engine 160 includes a booster 162 and a power turbine 164 connected by a first shaft 166, a high pressure compressor 168 and a high pressure turbine 170 connected by a second shaft 172, and a combustor 174. Engine 160 further includes pre-booster water spray injection apparatus 176 and pre-compressor water spray injection apparatus 178.

Figure 6:
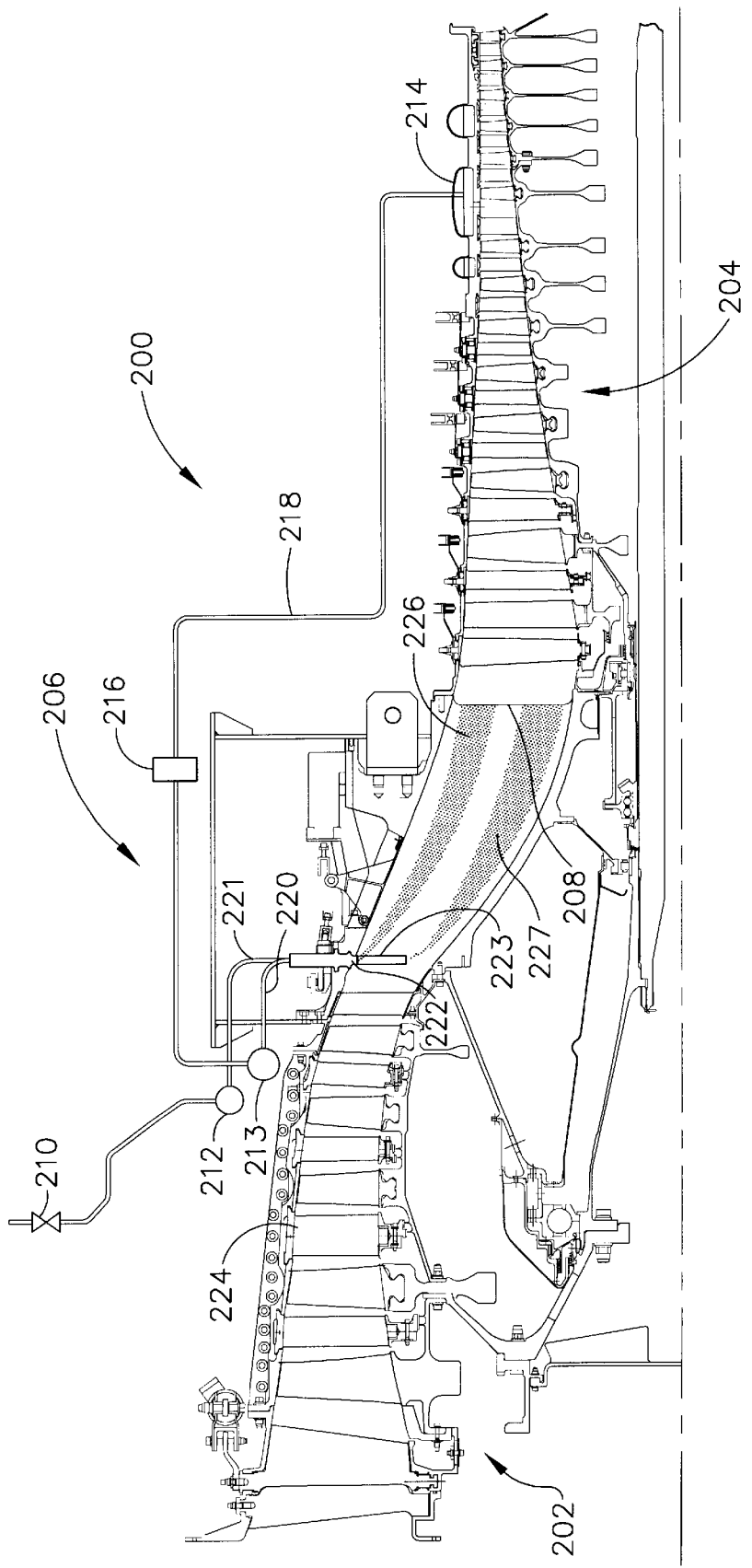
FIG. 6 is a schematic illustration of a gas turbine engine including compressor water injection in accordance with yet another embodiment of the present invention.

FIG. 6 is a schematic illustration of a gas turbine engine 200 including compressor water injection in accordance with yet another embodiment of the present invention. Engine 200 includes a low pressure compressor 202 and a high pressure compressor 204. In this embodiment, low pressure compressor 202 is a five stage compressor, and high pressure compressor 204 is a fourteen stage compressor. A combustor (not shown) is downstream from compressor 204. Engine 200 also includes a high pressure turbine (not shown) and a low pressure turbine (not shown). The high pressure turbine is a two stage turbine, and the low pressure turbine is a five stage turbine.

Engine 200 further includes a water injection apparatus 206 for injecting water into an inlet 208 of high pressure compressor 204. Water injection apparatus 206 includes a water metering valve 210 in flow communication with a water manifold 212. Water is supplied to metering valve 210 from a water source or reservoir. Air is supplied to an air manifold 213 from an eight stage bleed 214 of high pressure compressor 204. Bleed 214 serves as a source of heated air. A heat exchanger 216 is coupled to flow pipe or tube 218 which extends from eight stage bleed 214 to air manifold 213. Feeder tubes 220 and 221 extend from air manifold 213 and water manifold 212 to twenty four spray nozzles 222 and 223 radially spaced and extending through outer casing 224. Nozzles 222 are sometimes referred to herein as short nozzles 222, and nozzles 223 are sometimes referred to herein as long nozzles 223. Nozzles 222 and 223 are radially spaced around the circumference of casing 224 in an alternating arrangement as described below in more detail.

Twenty four water feeder tubes 221 extend from water manifold 212, and twenty four air feeder tubes 220 extend from air manifold 213. Each nozzle 222 is coupled to one water feeder tube 221 from water manifold 212 and to one air feeder tube 220 from air manifold 213. Generally, water flowing to each nozzle 222 and 223 is atomized using the high pressure air (e.g., at about 150 psi) taken off eight stage bleed 214 of high pressure compressor 204. The droplet diameter, in this embodiment, should be maintained at about 20 microns. Such droplet diameter is maintained by controlling the rate of flow of water through valve 210 using the water schedule described below in more detail and utilizing the high pressure air from bleed 214. Except for water spray injection apparatus 206, the various components of engine 200 are known in the art.

In operation, engine 200 is operated to its maximum power output without spray injection, i.e., water valve 210 is closed. In this mode of operation, air flows through air pipe 218 to nozzles 222 and 223. The air is cooled by heat exchanger 216. However, since no water is allowed through valve 210, no water is injected into the flow to high pressure compressor 204.

Once maximum power output is achieved, water injection apparatus is activated and water flows to nozzles 222 and 223. Heat exchanger 216 continues operating to reduce the temperature of the air supplied to nozzles 222 and 223. Particularly, the air flow from the eighth stage bleed 214 typically will be at about 600–650 degF. To reduce the thermal differential, or mismatch, between the bleed hot air and the water from the water reservoir, the temperature of the air from the eighth stage bleed 214 is reduced to about 250 degF. by heat exchanger 216 while maintaining the pressure of the air at about 150 psi. By maintaining the pressure at about 150 psi, the air has sufficient pressure to atomize the water.

Nozzles 222 and 223 inject water sprays 226 and 227 (illustrated schematically in FIG. 6) into the flow at inlet 208 of high pressure compressor 204, and the water spray enters into compressor 204 through inlet 208. Due to the high temperature environment at the location at which the water spray is injected, the water spray partially evaporates before entering high pressure compressor 204. The water spray cools the air flow in high pressure compressor 204 for at least each stage of compressor 204 through which such spray flows, i.e., until it evaporates. Usually by the sixth stage of compressor 204, the water spray is totally evaporated. The air is further compressed by high pressure compressor 204. and highly compressed air is delivered to the combustor. Airflow from the combustor drives the high pressure turbine and the low pressure turbine.

The water particles from water spray apparatus 206 provide the advantage that the temperature of the airflow at the outlet of high pressure compressor 204 (temperature T3) and the temperature of the airflow at the outlet of the combustor (temperature T41) are reduced as compared to such temperatures without the spray. Specifically, the water spray extracts heat from the hot air flowing into and through compressor 204, and by extracting such heat from the air flow, the T3 and T41 temperatures are reduced along with the required compressor power. Reducing the T3 and T41 temperatures provides the advantage that engine 200 is not T3 and T41 constrained, and therefore, engine 200 may operate at higher output levels by throttle pushing than is possible without such water spray.

That is, by injecting atomized water spray in front of high pressure compressor 204, the inlet temperature of high pressure compressor 204 is significantly reduced. Therefore, using the same compressor discharge temperature control limit, high pressure compressor 204 is able to pump more air, achieving a higher pressure ratio. This results in higher output and improved efficiency. In addition to increased power output, water spray injection as described above provides the advantage of less water consumption as compared to intercooling under the same conditions. Rather than the T3 and T41 temperature constraints, it should be understood that with the water spray configuration, the engine constraints may no longer be such temperatures, e.g., the constraints may the turbine inlet temperature T48 of the high pressure turbine and the core speed.

The above described water injection apparatus 206 may also be utilized in connection with pre-low pressure compressor water spray injection. It is believed that such pre-low pressure compressor water spray injection provides at least many of the same advantages as the intermediate, or pre-high pressure compressor, spray injection described above in connection with FIG. 9.

Figure 7:
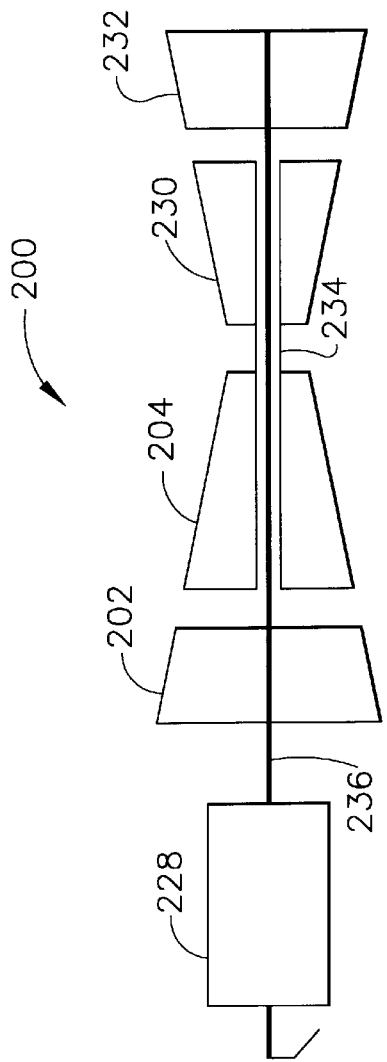
FIG. 7 is a schematic illustration of the gas turbine engine shown in FIG. 6 coupled to an electric generator.
Figure 10:
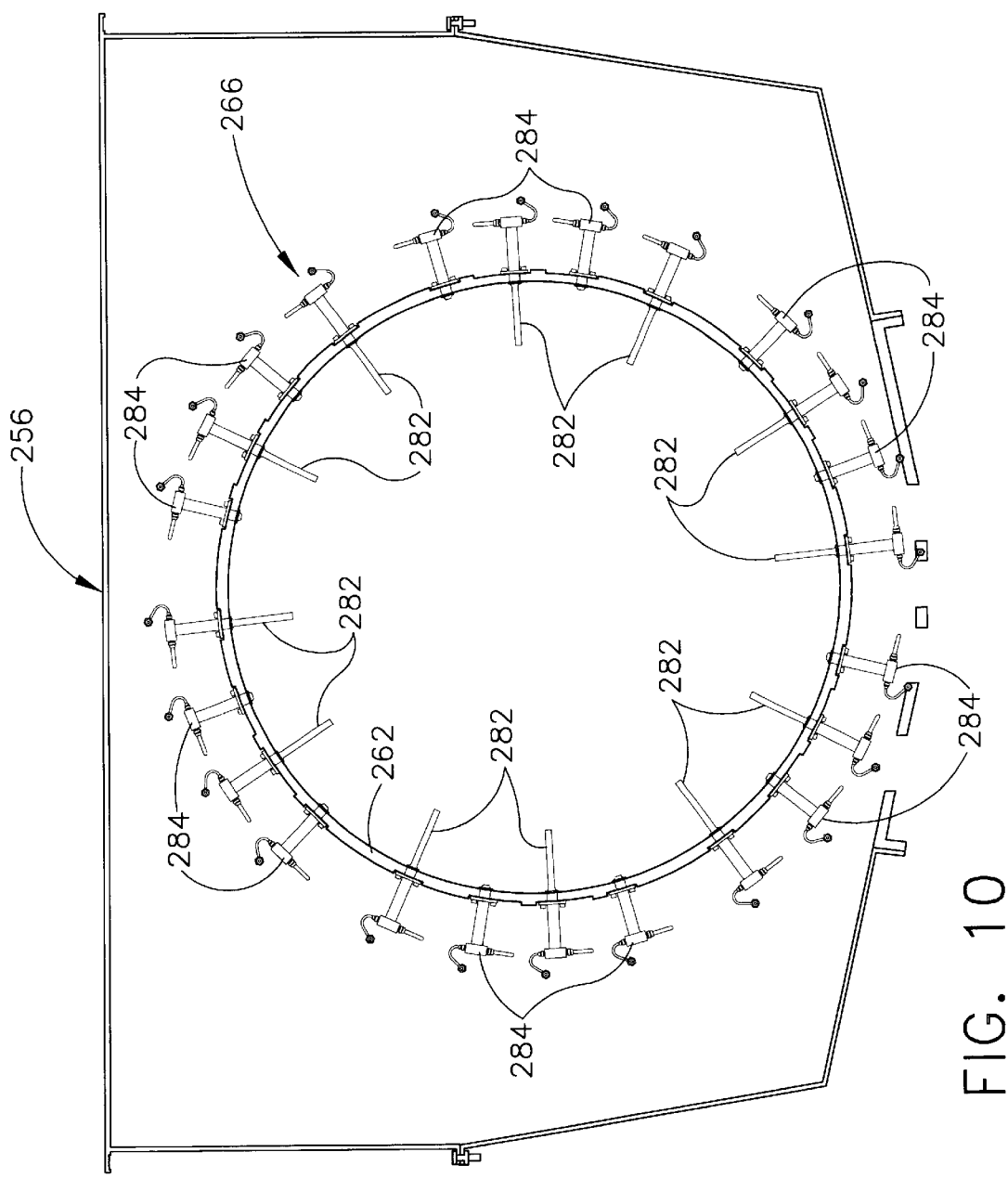
FIG. 10 is a cross sectional view of the engine shown in FIG. 8 and illustrating a nozzle configuration.
Figure 9:
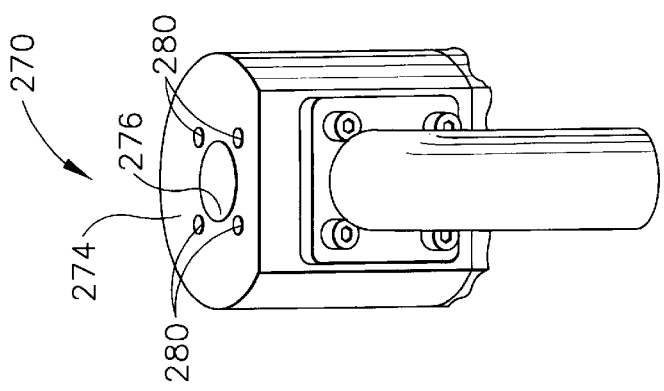
FIG. 9 is a perspective view of a connector for connecting the eight stage bleed of the engine shown in FIG. 8 to an air manifold.

FIG. 7 is a schematic illustration of gas turbine engine 200 coupled to an electric generator 228. As shown in FIG. 10, engine 200 includes a high pressure turbine 230 and a low pressure turbine 232 downstream from high pressure compressor 204. High pressure compressor 204 and high pressure turbine 230 are coupled via a first shaft 234, and low pressure compressor 202 and low pressure turbine are coupled via a second shaft 236. Second shaft 236 also is coupled to generator 228. Engine 200 may, for example, be the LM6000 Gas Turbine Engine commercially available from General Electric Company, Cincinnati, Ohio, 45215, modified to include water spray injection apparatus 206 (FIG. 9).

Rather than being originally manufactured to include injection apparatus 206, it is possible that apparatus 206 is retrofitted into existing engines. Injection apparatus 206 would be provided in kit form and include tubing 218 and 220, along with water and air manifolds 212 and 213 and water metering valve 210. Nozzles 222 and 223 also would be provided. When it is desired to provide water spray injection, nozzles 222 and 223 are installed in outer casing 224 and flow tube 218 is installed and extends from eighth stage bleed 214 to air manifold 213. Valve 210 is coupled between a water source and water manifold 212, and water manifold 212 is coupled to air manifold 213.

Figure 8:
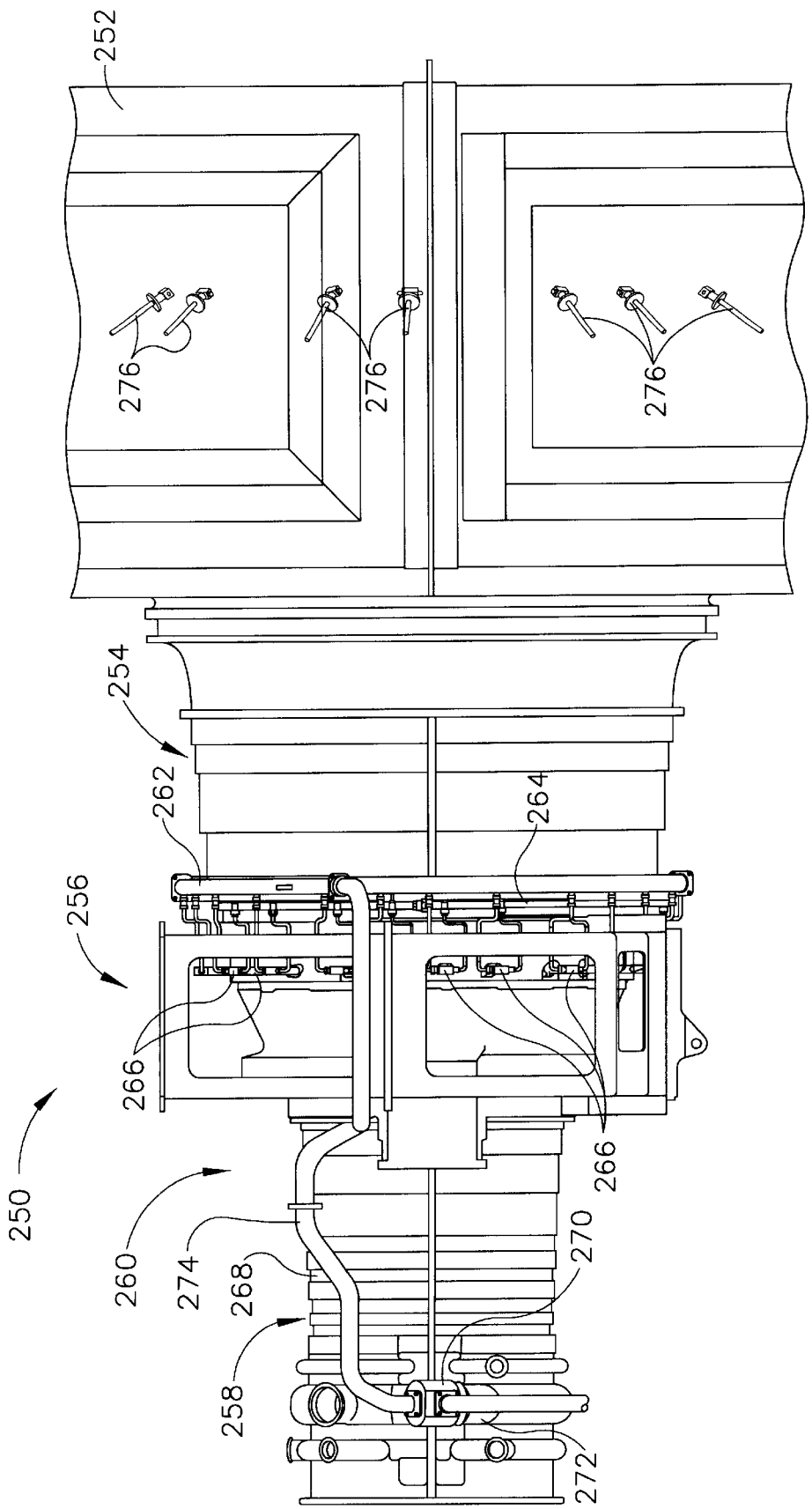
FIG. 8 is a side view of an LM6000 engine of General Electric Company modified to include spray injection.

FIG. 8 is a side view of an LM6000 engine 250 of General Electric Company modified to include spray injection. Engine 250 includes an inlet 252, a low pressure compressor 254, land front frame 256, and a high pressure compressor 258. Engine 250 is modified to include water spray injection apparatus 260, which includes an air manifold 262 and a water manifold 264 coupled to twenty four radially spaced nozzles 266 mounted to an engine outer casing 268. Nozzles 266 spray water into engine 250 at a location between low pressure compressor 254 and high pressure compressor 258. Injection apparatus 260 also includes a connector 270 for connecting to an eight stage bleed 272 of high pressure compressor 258, and a pipe 274 extending from connector 270 to air manifold 262. Although not shown in FIG. 8, a heat exchanger (air to air or water to air) may be coupled to pipe 274 to reduce the temperature of the air supplied to air manifold 262. For illustration purposes, nozzles 276 are shown secured to inlet 252 of low pressure compressor 254. Air and water manifolds also could be coupled to nozzles 276 to provide pre-low pressure compressor water spray injection. The components of injection apparatus 260 described above are fabricated from stainless steel.

High pressure compressor 258 includes stator vanes which typically are not grounded to case 268. When used in combination with water spray injection, it has been found that grounding at least some of such vanes which come into contact with the water spray may be necessary. To the extent required, and using for example, graphite grease, such vanes can be grounded to case 268. That is, graphite grease may be applied to the bearing area of such vanes. For example, such graphite grease can be used at the inlet guide vane and for each down stream vane through the second stage. In operation, a portion of the grease heats and dissipates, and the graphite remains to provide a conductive path from the vane to case 268.

It also should be understood if the water can be supplied to the water spray injection nozzles under sufficient pressure, it may not be necessary to supply high pressure air to nozzles. Therefore, it is contemplated that the eight stage bleed could be eliminated if such high pressure water is available.

FIG. 9 is a perspective view of connector 270 for connecting eight stage bleed 272 of engine 250. Connector 270 is configured to be threaded into engagement with engine casing 268 and includes an opening 274 normally closed by a bolt 276. When bleed air is desired to be provided to air manifold 262, bolt 276 is removed and pipe 274 is coupled to connector 270 using a mating flange at the end of pipe 274 that mates with surface 278 of connector 270. Bolt openings 280 enable the pipe mating flange to be bolted to connector 270.

FIG. 10 is a cross sectional view of engine 250 and illustrating nozzles 266. Nozzles 266 are configured so that water injected into the gas flow to high pressure compressor 258 provides substantially uniform radial and circumferential temperature reductions at the outlet of high pressure compressor 258. Nozzles 226 include a set 282 of long nozzles and a set 284 of short nozzles. In the configuration shown in FIG. 10, at least one short nozzle 284 is located at a radially intermediate location between two radially aligned long nozzles 282. Short nozzles 284 are about flush with the circumference of the flow path and long nozzles 282 extend about four inches into the flow path. Of course, other lengths nozzles may be utilized depending upon the desired operation results. In one specific implementation, nozzle 284 extends about 0.436 inches into the flow path, and nozzle 282 extends 3.686 inches into the flow path. The water ratio between short nozzles 284 and long nozzles 282 (e.g., 50/50) may also be selected to control the resulting coding at the compressor outlet.

The temperature sensor for obtaining the temperature at the inlet of the high pressure compressor (i.e., temperature T25), is aligned with a long nozzle 282. By aligning such temperature sensor with a long nozzle 282, a more accurate temperature measurement is obtained rather than having such sensor aligned with a short nozzle 284.

Figures 11, 12:
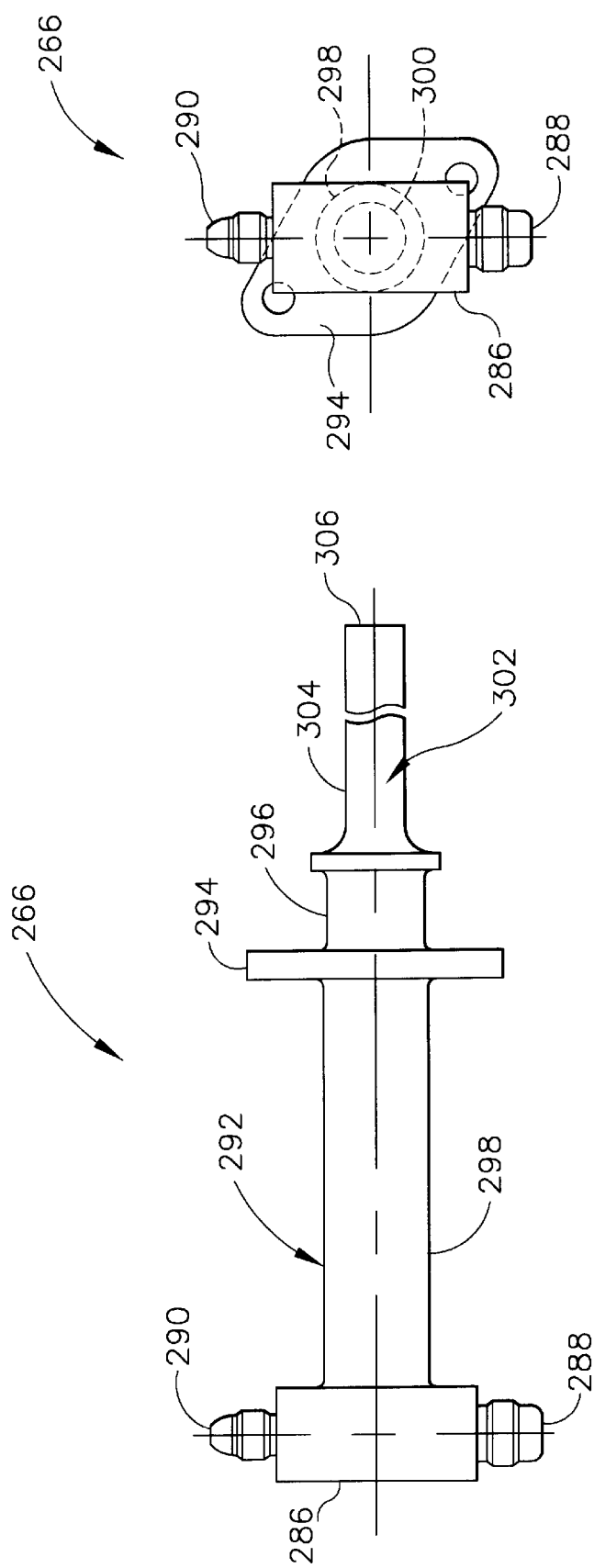
FIG. 11 is a side view of a nozzle.
FIG. 12 is a top view of the nozzle shown in FIG. 11.

FIGS. 11 and 12 illustrate one of nozzles 266. Long and short nozzles 282 and 284 differ only in length. Nozzle 266 includes a head 286 having an air nozzle 288 and a water nozzle 290. Air nozzle 288 couples to an air pipe (not shown) which extends from nozzle 288 to air manifold 262. Water nozzle 290 couples to a water pipe (not shown) which extends from nozzle 290 to water manifold 264. Nozzle 266 also includes a stem 292 and a mounting flange 294 for mounting nozzle 266 to case 262. A mounting portion 296 of stem 292 facilitates engagement of nozzle 266 to case 262.

Stem 292 is formed by an outer tubular conduit 298 and an inner tubular conduit 300 located within conduit 298. Air flows into nozzle 288 and through the annulus between outer conduit 298 and inner conduit 300. Water flows into nozzle 290 and through inner conduit 300. Mixing of the air and water occurs in stem portion 302 formed by a single conduit 304. An end 306 of nozzle 266 is open so that the water and air mixture can flow out from such end 306 and into the flow path.

Figure 13A:
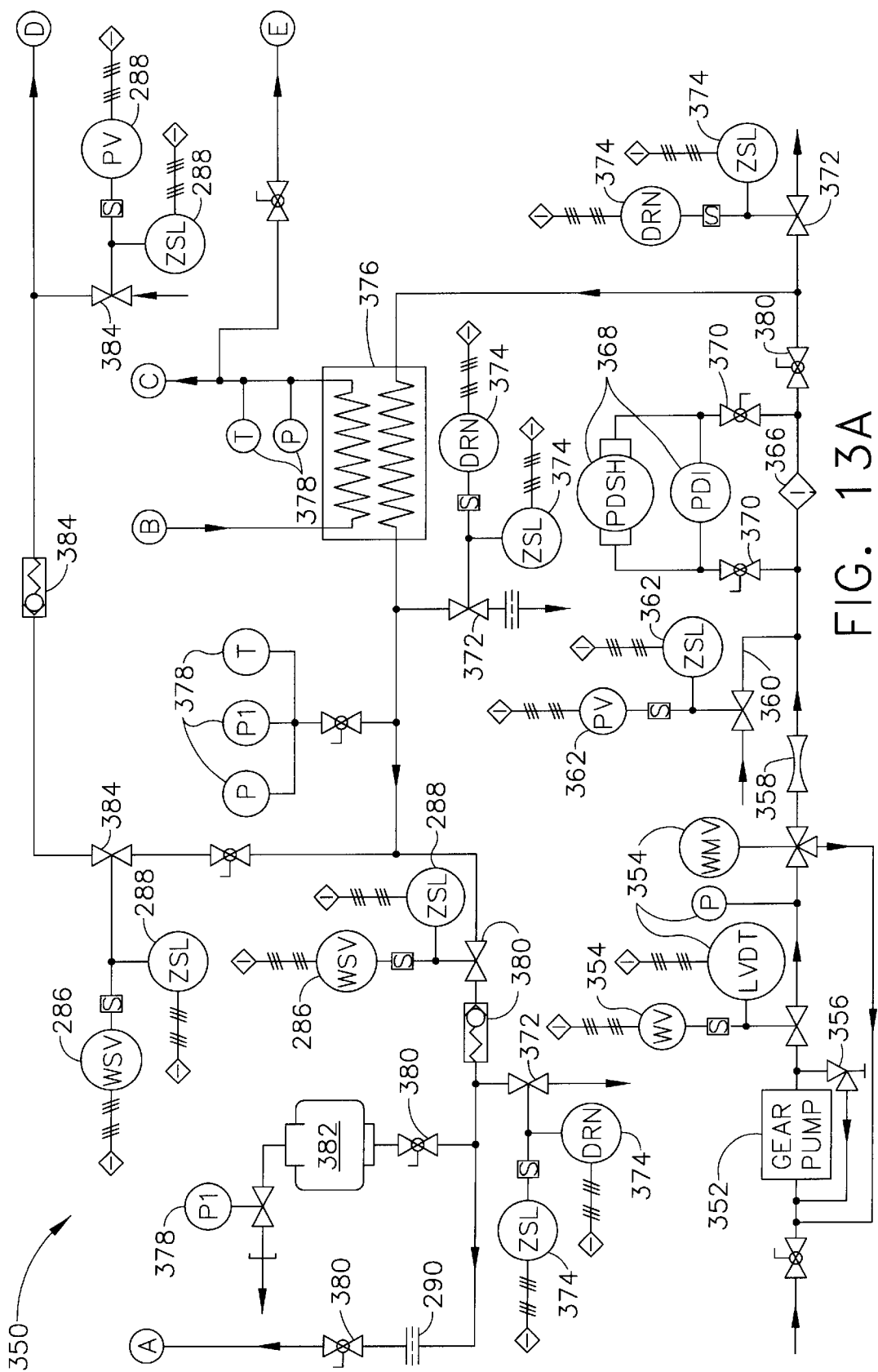
FIG. 13 is a schematic diagram of a control circuit for controlling the supply of water and air to the nozzles in the engine shown in FIG. 8.
Figure 13B:
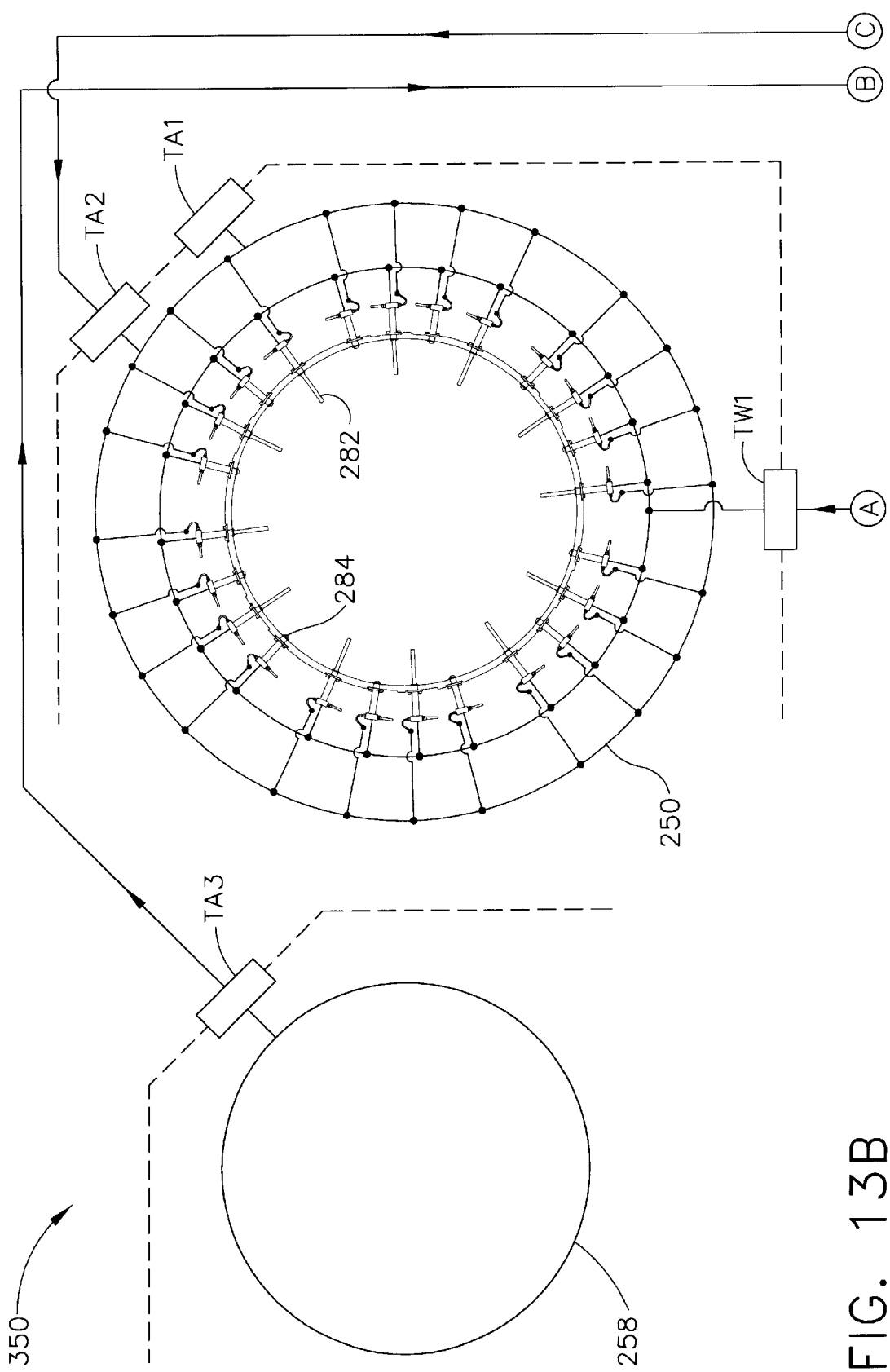
Figure 13C:
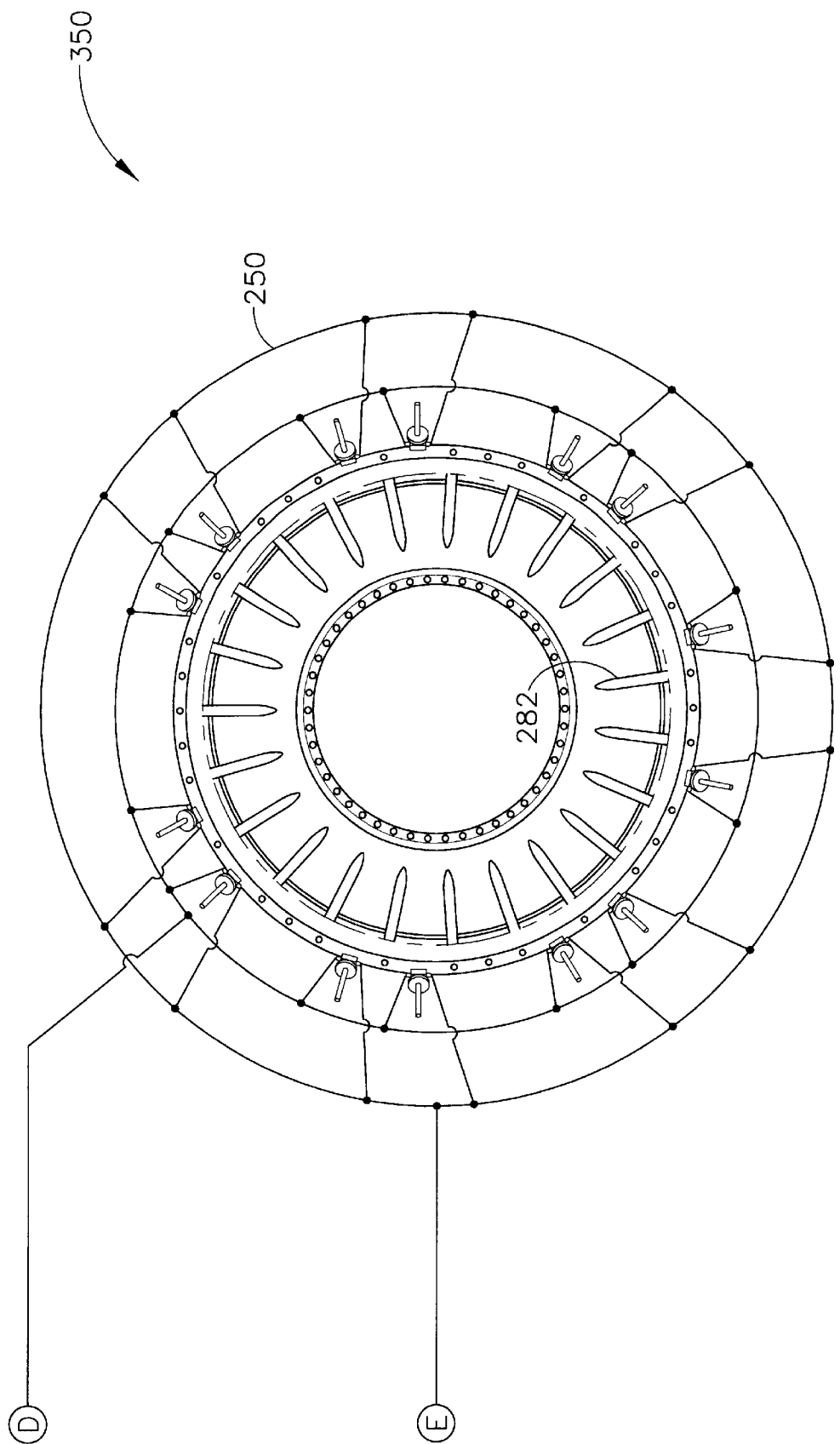

FIG. 13 is a schematic diagram of a control circuit 350 for controlling the supply of water and air to nozzles 282 and 284 in engine 250 for both frame water injection (aft looking forward) and inlet water injection (aft looking forward). As shown in FIG. 13, demineralized water is pumped through a motor driven water pump 352. Sensors 354 are coupled to the water delivery line such as a linear variable differential transformer, a pressure sensor, and a water meter valve. A relief valve 356 is connected in parallel with pump 352, and a flow meter 358 is coupled in series with pump 352. An air purge line 360 also is coupled to the water delivery line. Controls 362 for a normally closed solenoid valve control 364 air purge operations. A filter 366 also is provided in the water delivery line, and sensors 368 with valves 370 (manual hand valve-locking flag feature (normally open)) are coupled in parallel with filter 366.

Normally open valves 372, coupled to controls 374, are provided to enable water to drain from the water delivery line into a water drain system. Water in the water delivery line flows through a heat exchanger 376 which receives air from the eight stage bleed of high pressure compressor 258.

For frame water injection, multiple sensors 378 and control valves 380 control the supply of water to nozzles 282 and 284. Circuit 350 also includes a water accumulator 382. For inlet water injection, sensors 378 and control valve 384 control the supply of water to nozzles 282.

Letter designations in FIG. 13 have the following meanings.

T—temperature measurement location
P—pressure measurement location
PI—pressure indicator
N/C—normally closed
N/O—normally open
PDSW—pressure differential switch
PDI—pressure differential indicator
DRN—drain
ZS—position switch
WMV—water metering valve
PRG—purge
LVDT—linear variable differential transformer In FIG. 13, a solid line is a water supply line, a double dash line is a drain line, and a solid line with has marks is an electrical line. Boxes identify interfaces between the water supply system and the engine. Water metering valves 286 and other control/measurement valves 288, and an orifice 290 (for inlet water injection) are utilized in connection with the control of water flow through circuit 350.

Set forth below are the controls for various modes of operation of circuit 350 in connection with engine 250. In the description below, the designations Z_SPRINTON, Z_SPRINT, and Z_RAISE have the following meaning.

Z_SPRINTON=System supplier activation/sequence control for off engine H2O delivery.
Z_SPRINT=Core control logic schedule limit sequence following heat exchanger purge used for water injection, shutdown, and protective functions.
Z_RAISE=Z_SPRINT plus the manifold fill timer complete used for alarm functions.

also, an * indicates that the selected variable is tunable.

Pre-Injection Permissives/Purge Activation (AUTO or MANUAL)

1. T2>30 F.*=ON T2<27 F.*=OFF
2. Accumulator charge pressure>40 psig*
3. Operator sets Z_SPRINTON to TRUE Heat exchange purge to bypass initiated
   AUTO At anytime consistent with purge time required
   MANUAL on point of water injection initiation
4. Drain valves closed Injection Permissives (Pre-Injection Permissives 1–4 Satisfied)

1. PS3 50 psi* or less below limit schedule
2. T2 regulator not active (MANUAL Only)
3. Eight stage air pressure>(PS3/4)
4. Heat exchanger purge timer complete
5. $8^{th}$ stage air temperature less than 300 F.*
6. Water temperature less than 250 F.*

MANUAL Mode Sequence

1. Operator sets power to satisfy injection permissives 1–2 above and sets Z_SPRINTON=T (TRUE=ON)
2. Water pump on and heat exchange purge valve to bypass (minimum water flow).
3. Water heat exchanger purge reduce eight stage air temperature to <300 F. (Five min.*).
4. Z-SPRINT=T (TRUE=ON) SPRINT ShutOff valve opens (heat exchanger bypass diverted to engine), minimum scheduled flow to the engine
5. Flow fills manifold at minimum scheduled water flow for 60 sec.* Z_RAISE=T (TRUE=ON)
6. Operator raises SPRINT flow (0.5 gpm/sec) to maximum schedule level.
7. Operator raises power to desired level or as limited by MW, T3, T48, Ps3, XN25R3, or XN25R.
8. Power and water lowered as desired between schedule limits.
9. At PS3 60 psi below the base schedule limit sets Z_SPRINT=F and SPRINT ramp down (–2 gpm/sec) to minimum flow schedule and shutdown.
10. Activate Z_SPRINTON to OFF (FALSE=OFF) SPRINT ShutOff valve off diverts water from engine to bypass, water pump off, heat exchanger purge valve to bypass, opens the system drains and purges piping until clear and closes drains.

AUTO Mode (Permissives Satisfied)

1. Operator sets Z_SPRINTON to ON (TRUE=ON) in time to complete heat exchanger purge prior to SPRINT activation permissives.
2. Z_SPRINT=T will initiate automatically upon reaching permissive point.
3. SPRINT ShutOff valve opens (diverts water to the engine from bypass)
4. Manifold fill on minimum schedule (60 sec.*delay) Z_RAISE=T then ramps water (0.5 gpm/sec) to maximum scheduled flow.
5. Power ramps to desired level and limited by MW vs. T2 Limiter, T3, T48, Ps3, XN25R3, or XN25R.
6. Power lowered as desired to 60 psi* below the base schedule limit (T_P3BNVG) before SPRINT ramp down (–2 gpm/sec) to minimum flow schedule and shutdown occurs.
7. Activate Z-SPRINTON to OFF (FALSE=OFF) SPRINT ShutOff valve off, heat exchanger purge valve to bypass, water pump off, and open the system drains and purge piping until clear.

Alarm Requirements

Z_RAISE=TRUE (TRUE=ON) Manifold fill timer satisfied and SPRINT flowing for ALARMS.

1. Flow error (Idemand–metered)>3 gpm* for 5 seconds*–Alarm
2. $8^{th}$ stage air temperature>250 F.* for 5 seconds*–Alarm Water Shutdown Requirements Z_SPRINT=F initiates water shutdown thru ramp down control limits and activates water shutoff.

1. Flow error (demand–metered)>6 gpm* for 10 seconds*—set Z-SPRINT=F
2. Pressure loss below 24 psi* at water demand>6 gpm*—set Z SPRINT=F
3. Pressure loss below 50 psi* at water demand>10 gpm*—set Z_SPRINT=F
4. $8^{th}$ stage air temperature greater than 300 F.*—set Z_SPRINT=F
5. Eight stage air pressure<(PS3/4)—set Z_SPRINT=F
6. T2<27 F.—set Z_SPRINT=F
7. PS3 not within 60 psi* of Ps3 limit schedule—set Z_SPRINT=F
8. Any gas turbine shutdown, drop load, or step to idle—set Z_SPRINT=F (bypass water ramp down control)
9. Circuit breaker not closed—set Z_SPRINT=F (bypass water ramp down control)

Figure 14:
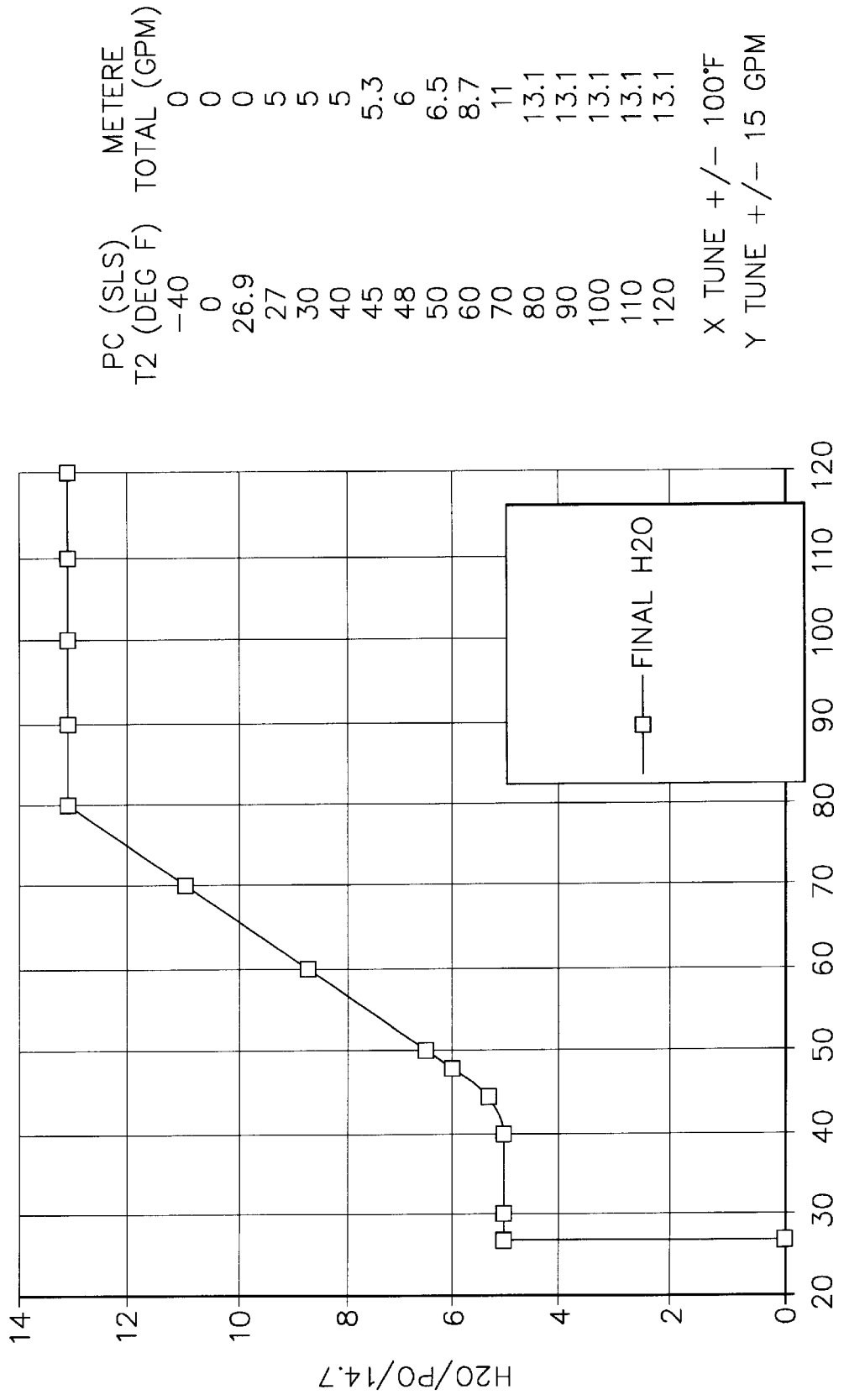
FIG. 14 is a chart illustrating an exemplary water schedule for the engine arrangement illustrated in FIG. 8.

FIG. 14 is a chart illustrating an exemplary water schedule for the engine arrangement illustrated in FIG. 8, and FIG. 15 is a chart illustrating the output, heat rate, flow, and water supplied to the engine illustrated in FIG. 8 at various ambient temperatures. The amount of water supplied to the nozzles varies depending, for example, on the ambient temperature as well as the size of the desired droplets. A droplet size of 20 microns has been found, in at least one application, to provide the acceptable results. Of course, the operating parameters of the engine in which water spray injection is utilized, the desired operating parameters, and other factors known to those skilled in the art affect the amount of water spray injection.

Figure 16:
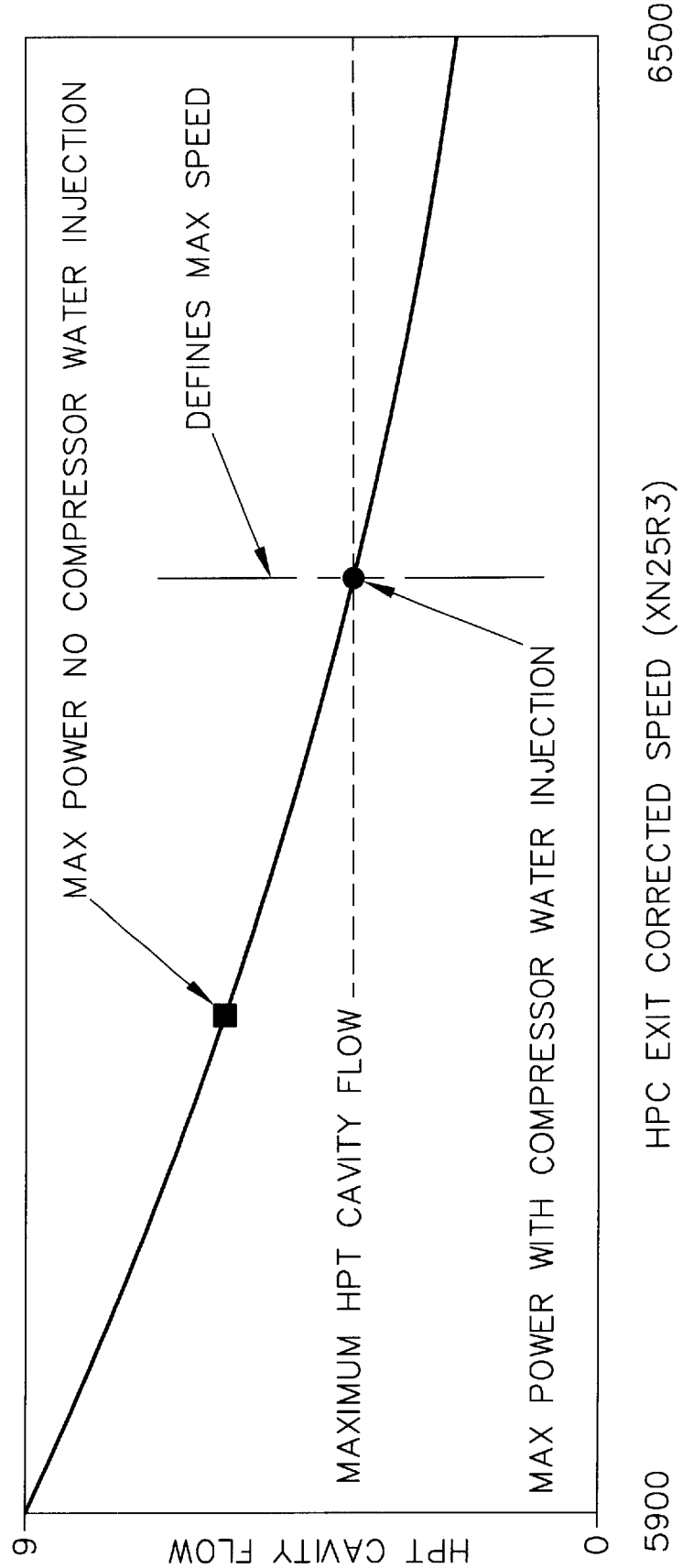
FIG. 16 is a chart illustrating the high pressure turbine cavity flow relationship versus the high pressure compressor exit corrected speed of the engine illustrated in FIG. 8.

FIG. 16 is a chart illustrating the high pressure turbine cavity flow relationship versus the high pressure compressor exit corrected speed of the engine illustrated in FIG. 8. An additional engine control limit is used with the engine illustrated in FIG. 8 to protect the high pressure turbine internal cavity temperatures from getting too hot as a result of ingesting high pressure turbine gas path air. The high pressure turbine cavities are cooled with air from the high pressure compressor at an adequate flow and pressure level such that there is always a positive air flow from the internal cavity into the high pressure turbine gas path, hence eliminating the possibility of ingestion. Since the objective of water injection into the compression components is to cool temperature T3 so the engine can be throttle pushed to increase power, the high pressure system runs faster than it normally would without the water injection. However, the parasitic air that is provided by the compressor to cool the turbine cavities is reduced. The curve illustrated in FIG. 16 shows the relationship of high pressure compressor cooling airflow as a function of the high pressure compressor speed corrected to the high pressure compressor exit temperature. The high pressure compressor exit corrected temperature is defined as:

HP physical speed*square root (International standard temperature/HPC exit temperature)

or, $$XN25R3 = XN25 * (T_{STD}/T3)^{1/2}$$

where $T_{STD}$=518.67°R (59° F.).

As shown in the curve illustrated in FIG. 16, there is a minimum high pressure turbine cavity flow required to ensure no high pressure turbine cavity ingestion. This level of flow and its relationship with high pressure compressor exit corrected speed define the XN25R3 that the engine must be controlled to as a maximum limit.

With respect to the droplet size, a minimum drop size at each flow rate should be produced to both reduce the residence time for complete evaporation and to hold drop sizes small enough to prevent blade erosion. Set forth below is a manner for analyzing droplet size. More specifically, and for a preliminary analysis, a 3D model of a 30° sector of the LM-6000 booster duct is employed to determine the velocity and temperature field in the duct. No swirl is assumed at the duct inlet and the nozzle tips are located in the outer casing at the inlet of the booster duct aimed radially inward. The nozzle axis was orthogonal to the outer casing surface and the injection point was about 0.2 in. radially inward from the casing surface. The nozzle generated drop size values were taken to be the smallest values of the RR drop size, given by Equation 1. Two smaller values (i.e., 10.5 µm and 7.5 µm) were also assumed to determine the effect of drop sizes smaller than those typically generated by air atomized nozzles. The results are set forth in FIG. 17. It was assumed that 36 nozzles at 0.5 GPM each were employed, i.e., 3 to a 30° sector.

$$\text{Volume Fraction above diameter } d = \exp\left(-\left(\frac{d}{d_{gg}}\right)^N\right) \quad (1)$$

Figure 18:
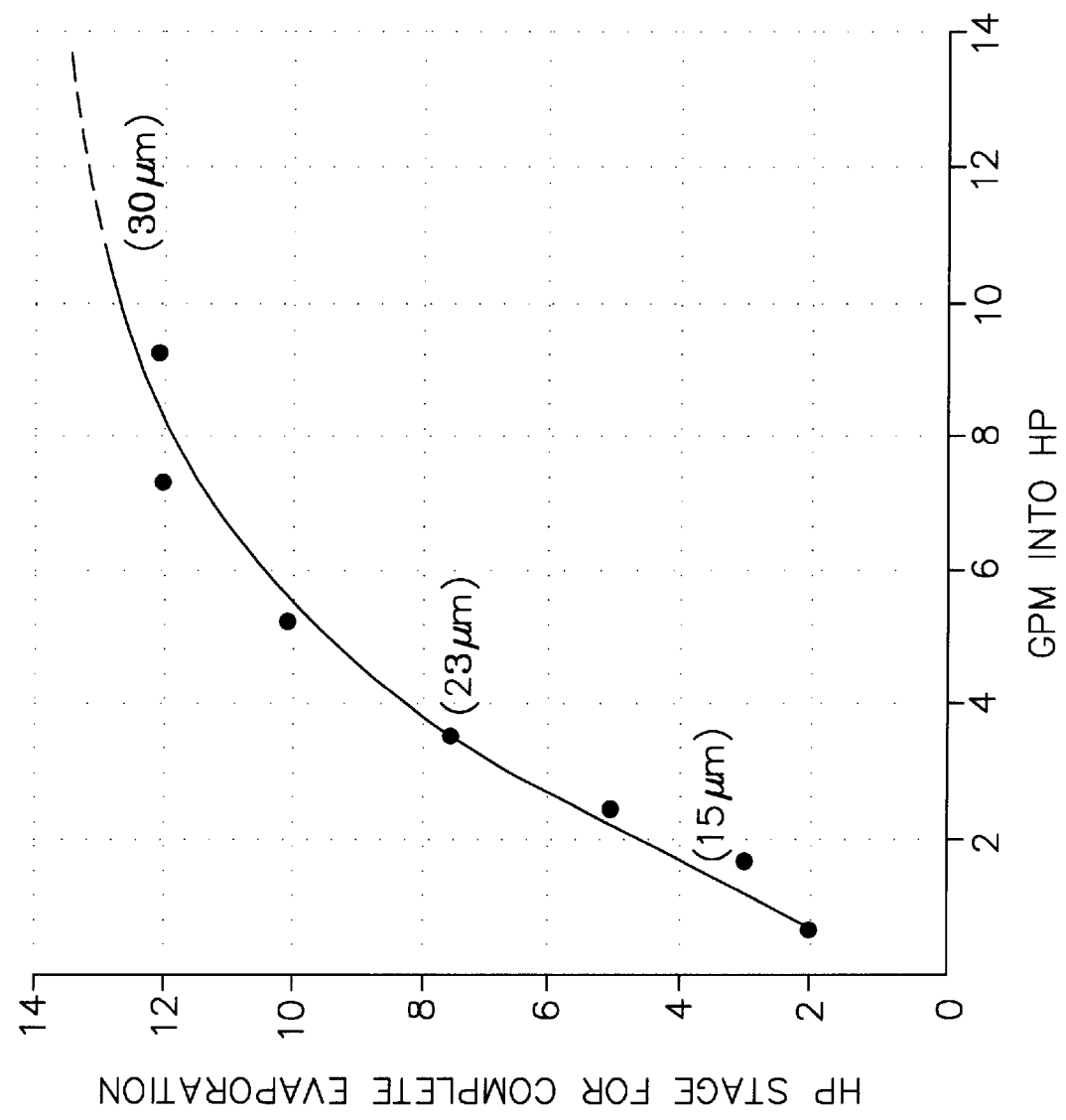
FIG. 18 is a graphical representation of water flow versus high pressure compressor evaporation.

The relation between the water flow at the inlet to the HP compressor and the stage for complete evaporation is shown in FIG. 18.

The data in FIG. 18 can be used to determine the approximate maximum drop size which has to be present at the inlet to the HP compressor in order to allow complete evaporation at the indicated stage. The drop sizes obtained are also shown in FIG. 18. This calculation assumes that the average drop size obtained from re-entrainment at wetted surface is the same as the deposited drop size. Due to the increasing air density and smaller amount of liquid present in the compressor the actual re-entrained drop sizes will be less than those shown in FIG. 18. Although it may seem unnecessary to generate smaller drops with spray nozzles than those that are generated in the compressor via re-entrainment, this is not so since the smaller the nozzle generated drops the smaller the fraction of the compressor inlet flow rate that deposits on the HP inlet guide vanes. In addition, the fraction of wetted area at stages where wetting was indicated could not be determined with any accuracy. It is possible, therefore, that less water was present in the HP compressor than that implied by the 'wet' casing temperatures.

The location for complete evaporation is shown in FIG. 19. The data shows that about 20% more water injection can be evaporated at a given stage than that calculated in the preliminary analysis.

The same nozzle flow rates and initial drop sizes as those given in FIG. 19 were located at the inlet to the LP compressor to evaluate the location of complete evaporation in the HP compressor. The smaller drop sizes generated by the nozzles cause only a fraction of the nozzle flow to be deposited on the inlet guide vanes of the LP compressor. While the deposited flow behaves the same, the fraction that does not deposit evaporates more rapidly in the LP compressor and booster duct.

The method for calculating the evaporation of the water initially deposited in the LP compressor is the same as that discussed previously. The evaporation of the fraction in drop form was calculated using a model that determines the location of complete drop evaporation. The latter was located in the LP compressor due to the small cut-off size for the undeposited flow. This cut-off size was calculated to be 13 µm at the inlet to the LP using a trajectory analysis. The results for the first four nozzles in FIG. 19 are shown in FIG. 20 where a total of 18 GPM is again injected initially at 0.5 GPM per nozzle.

As a calibration for the effect of the drop cut-off size on initial deposition, if a 13 µm rather than a 10 µm cut-off size is employed for nozzle 3 in FIG. 20, then complete evaporation would take place at the $11^{th}$ stage rather than the 9–10th stage of the HP compressor. Compared to injection at the booster duct inlet, somewhat less evaporation takes place in the booster duct due to an increase of the average drop size in the booster duct with injection at the LP inlet, while evaporation in the LP compressor results in earlier evaporation in the HP compressor.

With respect to nozzle selection and performance, the performance of selected pressure and air atomized nozzles and their effect on evaporation in the HP compressor requires knowledge of the temporal drop size distribution generated by the nozzles in the environment in which they are to be employed. The temporal size distribution has to be measured at the air density of interest. The spatial distribution of drop size, liquid volume fraction and drop velocity profile needs to be measured to calculate the temporal drop size.

A spray tunnel can be employed to measure the performance of the nozzles. The tunnel, in an exemplary test, is supplied by up to 7 lb/s air at pressures sufficient to match the booster duct air density of 0.13 lb/ft.³. The air velocity in the tunnel was varied from 45 to 75 ft/s to eliminate reverse circulation of the spray at the outer spray boundary and to keep the spray diameter small enough to avoid drop impingement on the quartz windows. The air temperature was kept below 95° F. to eliminate the need to account for evaporation between the nozzle and measurement locations.

The radial distribution of the drop velocities in the axial direction are obtained from the measurement of the air velocities of the respective atomizing air flow rates but without water flow. The radial values of the RR drop size are multiplied by the radial values of the liquid volume fraction and axial drop velocities with the resulting product then integrated over the spray radius. After dividing by the integrated mean liquid volume fraction and axial velocity over the spray cross-section, the mean flowing RR drop size is obtained.

The air atomized nozzle performance is better than that of the pressure atomized nozzle. At 135 psig, 24 air atomized nozzles at 24 GPM total injection allows evaporation in the HP compressor while the 3000 psi pressure atomized nozzles cause 5 GPM out of the 24 GPM to break through the HP compressor. In order to evaporate 24 GPM in the HP compressor with pressure atomized nozzles at 1 GPM per nozzle, at least some nozzle configurations would have to be operated at 5000 psi. At lower water rates per nozzle, the air atomized nozzle performance improves while the pressure atomized nozzle performance decreases if the nozzle configuration is not changed. Nozzles are commercially available from FST Woodward, Zeeland, Mich., 49464.

Again, and in summary, the above described water spray injection provides the important result that increased power output can be obtained using the same compressor discharge temperature control limit. That is, by injecting atomized water spray in front of the booster and/or high pressure compressor, the inlet temperature of the high pressure compressor is significantly reduced. Therefore, using the same compressor discharge temperature control limit, the high pressure compressor is able to pump more air, achieving a higher pressure ratio. This results in higher output and improved efficiency. In addition to increased power output, the above described water spray injection provides the advantage of less water consumption as compared to intercooling under the same conditions.

While the invention has been described in terms of various specific embodiments, those skilled in the art will recognize that the invention can be practiced with modification within the spirit and scope of the claims.

What is claimed is:

1. A turbine engine comprising:
   a low pressure compressor comprising an inlet and an outlet;
   a high pressure compressor comprising an inlet and an outlet, said high pressure compressor in axial flow relationship with, and downstream from, said low pressure compressor, said high pressure compressor is a multi-stage compressor;
   a combustor downstream from said high pressure compressor;
   a high pressure turbine downstream from said combustor;
   a low pressure turbine in axial flow relationship with, and downstream from, said high pressure turbine;
   a water injection system comprising:
      a plurality of nozzles for injecting water into a gas flow through said engine, said nozzles comprising a plurality of long nozzles and short nozzles, said nozzles arranged in alternating configuration such that at least one of said short nozzles is circumferentially intermediate each pair of long nozzles;
      a water source;
      a water manifold;
      a water supply line extending from said water source to said water manifold;
      a water metering valve for controlling flow through said water supply line;
      an air manifold;
      an air flow pipe coupled to all intermediate stage of said high pressure compressor and to said air manifold;
      a plurality of air feeder tubes extending from said air manifold to said nozzles;
      an air bleed valve for controlling a size of water droplets discharged from said nozzle;
      a plurality of water feeder tubes extending from said water manifold to said nozzles.

2. An engine in accordance with claim 1 wherein said low pressure compressor is a five stage compressor and said high pressure compressor is a fourteen stage compressor.

3. An engine in accordance with claim 2 wherein said air bleed valve is proximate an eighth stage of said high pressure compressor, said bleed valve positioned for controlling air flow to said air manifold.

4. An engine in accordance with claim 1 further comprising a heat exchanger coupled to said air flow pipe.

5. An engine in accordance with claim 1 wherein water and air flow to said nozzles is controlled so that the water is atomized into droplets.

6. An engine in accordance with claim 5 wherein the droplets have a diameter of about 20 microns.

7. An engine in accordance with claim 1 wherein said nozzles are upstream from said high pressure compressor inlet.

8. An engine in accordance with claim 1 wherein said nozzles are upstream from said low pressure compressor inlet.

9. An engine in accordance with claim 1 wherein said nozzles are downstream from said low pressure compressor inlet.

10. An engine in accordance with claim 1 further comprising an intercooler in series flow relationship with said low pressure compressor and said high pressure compressor, said intercooler comprising an inlet coupled to said low pressure compressor outlet for receiving at least a portion of gas flowing from said low pressure compressor outlet, and an outlet coupled to said high pressure compressor inlet.

11. An engine in accordance with claim 1 wherein said high pressure compressor and said high pressure turbine are coupled via a first shaft, and said low pressure compressor and said low pressure turbine are coupled via a second shaft.

12. An engine in accordance with claim 1 wherein said high pressure compressor comprises a plurality of stators, said stators electrically grounded.

* * * * *

UNITED STATES PATENT AND TRADEMARK OFFICE
CERTIFICATE OF CORRECTION

PATENT NO. : 6,553,753 B1
DATED : April 29, 2003
INVENTOR(S) : Payling et al.

It is certified that error appears in the above-identified patent and that said Letters Patent is hereby corrected as shown below:

Column 16,
Line 2, delete "all" and insert therefor -- an --.

Signed and Sealed this

Fifth Day of August, 2003

JAMES E. ROGAN
*Director of the United States Patent and Trademark Office*